United States Patent

Hampton

[11] Patent Number: 5,337,711
[45] Date of Patent: * Aug. 16, 1994

[54] CAMSHAFT PHASE CHANGE DEVICE

[75] Inventor: Keith Hampton, Ann Arbor, Mich.

[73] Assignee: Eaton Corporation, Cleveland, Ohio

[*] Notice: The portion of the term of this patent subsequent to Aug. 17, 2010 has been disclaimed.

[21] Appl. No.: 102,684

[22] Filed: Aug. 5, 1993

Related U.S. Application Data

[62] Division of Ser. No. 924,766, Nov. 18, 1992, Pat. No. 5,235,941, which is a division of Ser. No. 840,234, Feb. 24, 1992, Pat. No. 5,172,658.

[51] Int. Cl.$^5$ ............................................. H01L 1/34
[52] U.S. Cl. .............................. 123/90.17; 123/90.31; 464/2
[58] Field of Search ............... 123/90.15, 90.17, 90.31; 464/1, 2, 160

[56] References Cited

U.S. PATENT DOCUMENTS

| 3,721,220 | 3/1973 | Garcea | 123/90.15 |
|---|---|---|---|
| 4,627,825 | 12/1986 | Bruss et al. | 123/90.17 |
| 4,872,427 | 10/1989 | Gustafson | 123/90.16 |
| 4,901,831 | 2/1990 | Ito et al. | 192/38 |
| 5,002,023 | 3/1991 | Butterfield et al. | 123/90.15 |
| 5,046,460 | 9/1991 | Butterfield et al. | 123/90.15 |
| 5,056,477 | 10/1991 | Linder et al. | 123/90.17 |
| 5,056,478 | 10/1991 | Ma | 123/90.17 |
| 5,056,479 | 10/1991 | Suga | 123/90.17 |
| 5,078,647 | 1/1992 | Hampton | 464/1 |
| 5,172,658 | 12/1992 | Hampton | 123/90.17 |
| 5,172,660 | 12/1992 | Hampton | 123/90.17 |
| 5,172,661 | 12/1992 | Brune et al. | 123/90.17 |
| 5,172,662 | 12/1992 | Hampton | 123/90.17 |
| 5,219,313 | 6/1993 | Danieli | 123/90.17 |
| 5,234,088 | 8/1993 | Hampton | 123/90.17 |
| 5,235,941 | 8/1993 | Hampton | 123/90.17 |

FOREIGN PATENT DOCUMENTS

| 043053376729 | 7/1991 | European Pat. Off. . |
| 3615746 | 11/1987 | Fed. Rep. of Germany . |
| 9200441 | 1/1992 | World Int. Prop. O. . |

Primary Examiner—E. Rollins Cross
Assistant Examiner—Weilun Lo
Attorney, Agent, or Firm—Paul S. Rulon

[57] ABSTRACT

Devices (10,110,150,200 and 250) include roller clutches for controlling rotational phase change of a camshaft between full advance and full retard positions and positions therebetween. Each of the devices includes sets of selectively operative rollers such as a set of rollers (36) for preventing phase retard and a set of rollers (34) for preventing phase advance. Devices (10,110,150 and 200) have pairs of rollers 36,34 acted on respectively by ramp surfaces (32d,32c) defined by a common flat surface. An annular member (32) defining ramp surface (32d,32c) is mounted with free play relative to an axis of the camshaft. Device (110) includes a splitter spring (112). Devices 150 and 200 include internal actuators (152,202).

14 Claims, 6 Drawing Sheets

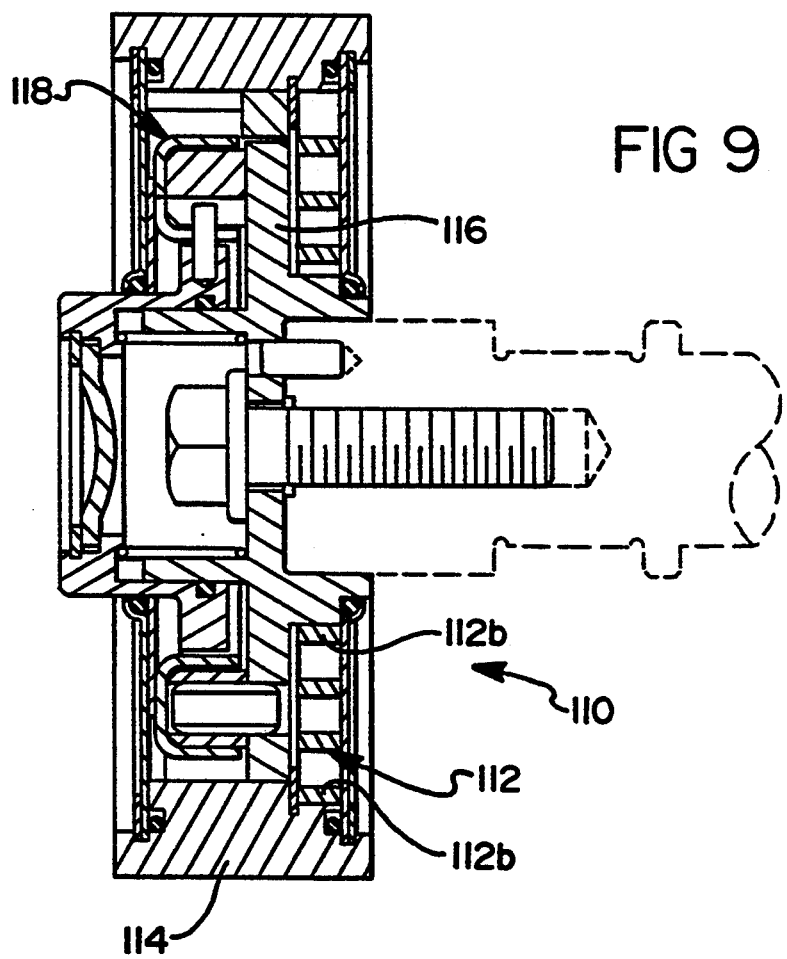
FIG 9
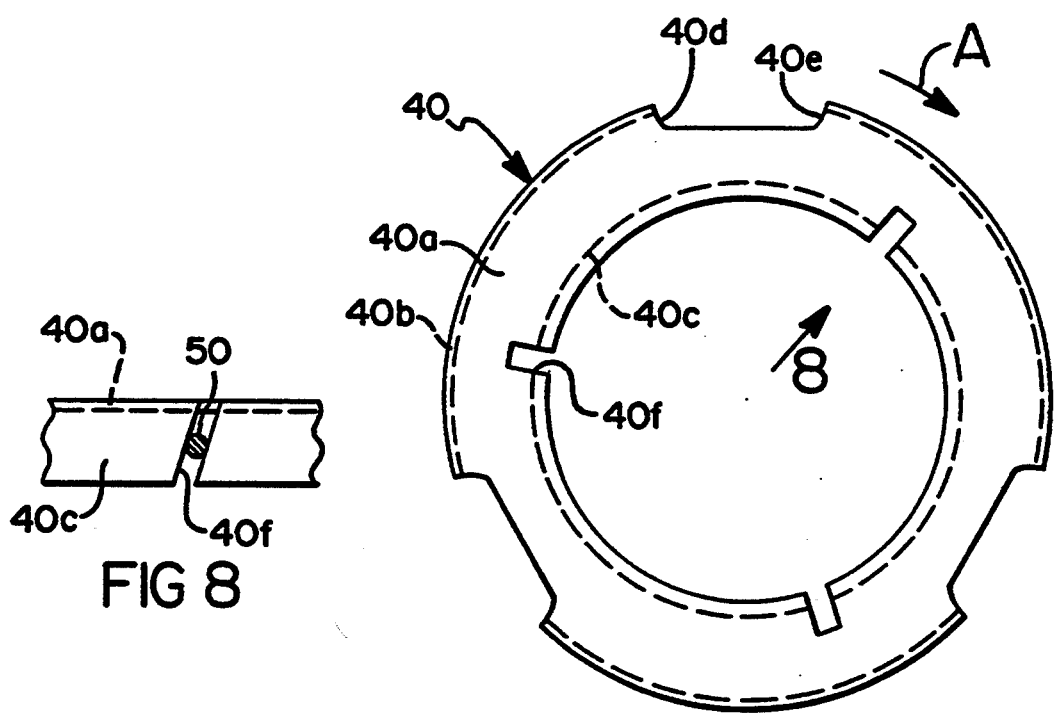
FIG 8
FIG 7

CAMSHAFT PHASE CHANGE DEVICE

This is a divisional of copending application(s) Ser. No. 07/924,766 filed on Nov. 18, 1992 now U.S. Pat. No. 5,235,941, which is a divisional of application Ser. No. 07/840,234 filed on Feb. 24, 1992 and now U.S. Pat. No. 5,172,658.

CROSS-REFERENCE

This application is related to U.S. application Ser. Nos. 07/840,233, 07/840,234 and 07/840,258, filed Feb. 24, 1992 now U.S. Pat. Nos. 5,172,660, 5,172,658, and 5,172,662, respectively and assigned to the assignee of this application.

FIELD OF THE INVENTION

This invention relates to a device for varying the angular phase relation between two rotating members. More specifically, the invention relates to such a device adapted to vary the angular phase relation between a camshaft and a crankshaft of an internal combustion engine.

BACKGROUND OF THE INVENTION

Devices for varying or changing the angular phase relation or timing between an engine crankshaft and camshaft are well known. It is also known that such devices may utilize cyclic torque characteristics in an engine valve gear train to provide forces for effecting the phase changes. Examples of such devices utilizing the cyclic torque may be seen by reference to U.S. Pat. Nos. 3,721,220 to Garcea; 4,627,825 to Bruss et al; 5,002,023 and 5,046,460 to Butterfield et al; 5,056,477 to Linder et al; 5,056,478 to Ma; 5,056,479 to Larga; 5,078,647 to Hampton; and to published European Patent application 0,438,720. All of these references are incorporated herein by reference.

As disclosed in Pat. No. 5,078,647 to Hampton and herein, torque in the valve gear train includes a substantially constant, positive, noncyclic torque portion due to valve gear friction and in some engines due to valve opening overlap, positive torque pulses during valve opening and compression of the valve springs, and negative torque pulses during valve closing and driving of the camshaft by stored forces in the compressed valve springs. The substantially constant positive torque and the positive torque pulses are, of course, additive and occur when crankshaft torque is driving the phase change device and the camshaft. These positive torques are utilized by the devices of the above references to retard camshaft rotation relative to the crankshaft. The negative torque pulses subtract from the positive directed torque and may be utilized to advance camshaft rotation relative to the crankshaft.

In engine valve gear trains with relatively low constant positive torque, portions of the amplitudes of the negative torque pulses extend negatively below a zero torque reference of the positive directed torque and tend to drive the camshaft and phase change device in the same direction as the positive directed torque. In engines having valve gear trains with relatively high constant torque, portions of the amplitude of the negative torque pulses may not extend below the zero torque reference and therefore, are not available to effect camshaft phase advance. The negative pulses may be made available by transmitting all or part of the high constant torque to the camshaft with a bypass or splitter spring disposed in parallel with portions of the phase change device that utilize the negative torque pulses to advance the camshaft. Such splitter springs are disclosed in previously mentioned U.S. Pat. Nos. 5,046,460; 5,056,477 and 5,078,647.

The rotational phase change devices in previously mentioned U.S. Pat. No. 5,078,647 and application Ser. No. 0,438,720 employ one-way roller clutches to effect phase advance and retard in response to the negative torque pulses and the positive directed torque, respectively. In these references, the rollers may be selectively positioned to prevent retarding rotation of the camshaft in response to positive directed torque and to allow advancing rotation of the camshaft in response to the negative torque pulses. Conversely, the rollers may be selectively positioned to prevent the advancing rotation by the negative torque pulses and to allow the retarding rotation by the positive directed torque. The roller clutches in these devices allow the camshaft to be either fully retarded or advanced within a range determined by stops in the devices.

All of the above mentioned phase change devices have certain disadvantages which have prevented or limited their use in mass production. For example, they tend to be difficult to package in the limited space normally available, they tend to have prohibitive mechanical complexity and therefore are expensive, they tend to be unreliable, they tend to be difficult to control, and/or they operate slower than desired when changing phase angles. Certain of the above devices that are capable of phase modulation, i.e., intermediate phase angle positions between full retard and advance, are believed to operate too slow to fully utilize the modulation feature since intermediate phase angle positions are often needed during rapidly changing engine operating conditions. Further, the above roller clutch phase change devices are either incapable of phase modulation or do not reliably provide phase modulation.

SUMMARY OF THE INVENTION

An object of this invention is to provide an improved device for changing the rotational phase relation between two rotating members.

According to a feature of this invention, a rotational phase change device includes first and second members disposed for rotation about an axis, and an assembly for coupling the members and selectively advancing and retarding rotation of the members relative to each other during rotation of the members in one direction by a torque having positive and negative torque pulses with respect to an average value of the torque.

The improvement is characterized by the assembly comprising an advance and a retard one-way clutch means including first annular means disposed for rotation with one of the members about the axis and having race surface means common to both clutch means. A second annular means is disposed for rotation with the other member and has a plurality of first and a plurality of second ramp surfaces spaced from the race surface means. A first wedge is interposed for wedging engagement between each first ramp surface and the race surface means. The first wedges are operative when in engagement to prevent the retarding rotation in response to the positive torque pulses. A second wedge is interposed for wedging engagement between each second ramp surface and the race surface means. The second wedges are operative when in engagement to prevent the advancing rotation in response to the negative torque pulses. Spider means are moveable in first and second opposite directions for respectively moving the first and second wedges out of engagement. Actuator means are selectively moveable between first and second positions for moving the spider means in the first and second directions, And attachment means loosely connect one of the annular means to one of the members with free play therebetween for effecting uniform spacing between the ramp surfaces and the race surface means.

BRIEF DESCRIPTION OF THE DRAWINGS

The phase change devices of the present invention are shown in the accompanying drawings in which:

FIG. 7 is a view of a component in the device of FIGS. 1 and 4–6;

FIG. 8 is a partial view of a portion of the component of FIG. 7 looking in the direction of arrow 8;

FIG. 9 is a modified view of the device in FIG. 1; and

DETAILED DESCRIPTION OF THE DRAWINGS

Figure 1:
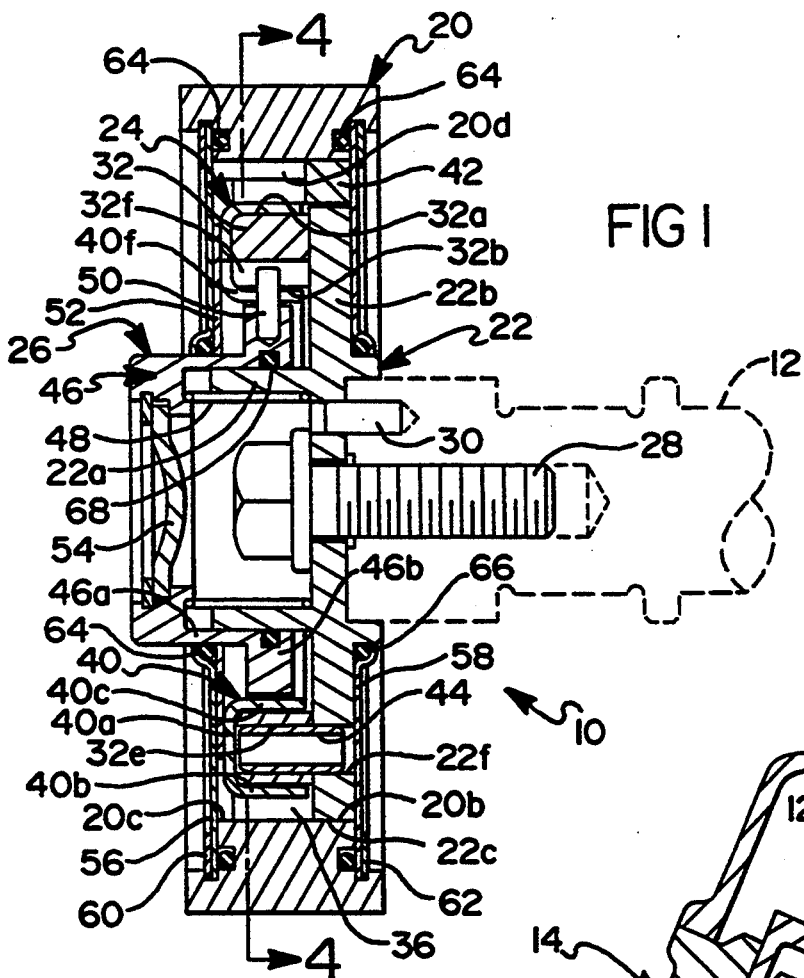
FIG. 1 is a cross-sectional view of one of the devices looking along staggered line 1—1 of FIG. 4.
Figure 2:
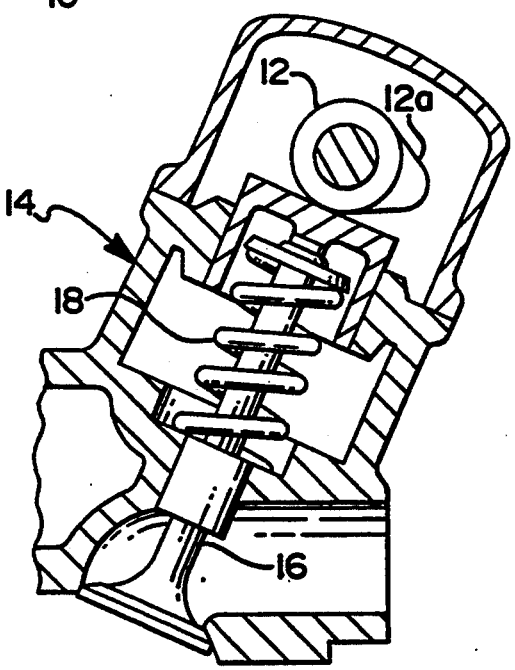
FIG. 2 is a sectional view of a portion of an engine.

Looking now at FIGS. 1–8, therein is shown an angular phase change device 10 adapted to be fixed to and rotate about an axis of a camshaft 12 of an internal combustion engine 14 partially shown in the schematic of FIG. 2. The camshaft is partially shown in phantom lines in FIG. 1. The engine includes an unshown crankshaft which transmits torque in known manner to the engine valve gear train and thereby rotates device 10 and camshaft 12 in a clockwise direction indicated by arrow A in FIG. 4.

Lobes 12a on the camshaft effect periodic opening and closing of intake and/or exhaust valves 16 which are biased toward a closed position by valve springs 18 in known manner. The springs store energy provided to the camshaft from the crankshaft during valving opening and return the stored energy to the camshaft during valve closing, thereby causing a cyclic torque across device 10. The cyclic torque includes positive and negative going pulses respectively corresponding to valve openings and closings. The torque across device 10 also includes a substantially constant torque portion due mainly to valve gear train friction and in some engines further due to valve opening overlap, i.e. concurrent compressing of more than one valve spring.

Figure 3:
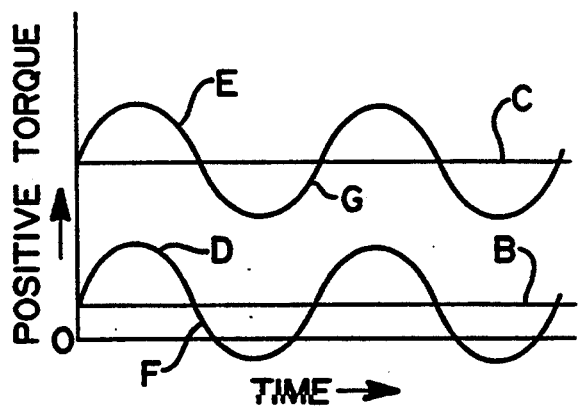
FIG. 3 is a graph illustrating camshaft torque characteristics in an engine.

The graph of FIG. 3 illustrates, in simplified form, the effect of the cyclic torque pulses in a valve gear train having a rather low constant torque represented by a constant positive torque B and a valve gear train having a greater constant positive torque represented by a constant torque C. As is readily seen, the cyclic portions of the total torque for each valve gear train have positive going torque pulses D,E which add to the associated constant torque, and negative going pulses G,F, which subtract from the constant torque. The negative going pulses G associated with constant torque C remain positive with respect to the zero torque reference of the graph. However, part of the negative going pulses F associated with constant torque B are negative with respect to the zero torque reference and at this time are driving the phase change device. The phase change device herein utilizes the positive torque portions to retard camshaft rotation relative to the crankshaft and utilizes the negative going torque pulses to advance camshaft rotation relative to the crankshaft. When phase change device 10 is used in valve gear trains wherein parts of the negative going torque pulses are not negative with respect to the zero torque reference due to high constant torque, the constant torque is shifted toward the zero reference by providing the phase change device with a splitter spring which bypasses all or a portion of the constant torque around the phase changing mechanism of phase change device, whereby positive and negative torque pulses relative to the new zero reference are applied to the phase changing mechanism of the device for effecting phase retard and advance.

Device 10 includes a drive or sprocket member 20, a driven or support member 22, a double-acting roller clutch assembly 24, and an actuator assembly 26. Support member 22 includes a hub portion 22a and a flange portion 22b extending radially outward the hub portion. The hub portion is affixed to an end of the camshaft for rotation therewith about the camshaft axis by a fastener such as bolt 28. Fixed timing of the support member to the camshaft is via a dowel pin 30.

Drive member 20 is substantially annular in shape and is synchronously driven in fixed angular phase relation with the unshown crankshaft in known manner. Herein, the drive is via an unshown cog belt which mates with cog teeth 20a formed in the outer periphery of drive 20. A radially inwardly facing portion of the drive member includes a cylindrical surface 20b journaled on an outer cylindrical surface 22c of flange portion 22b. An axial extension of surface 20b defines a cylindrical outer race surface 20c of the roller clutch assembly. The structure defining the drive member and the outer race surface may be a single member as in FIG. 1 or separate members as shown and described with respect to FIGS. 10 and 11.

Figure 4:
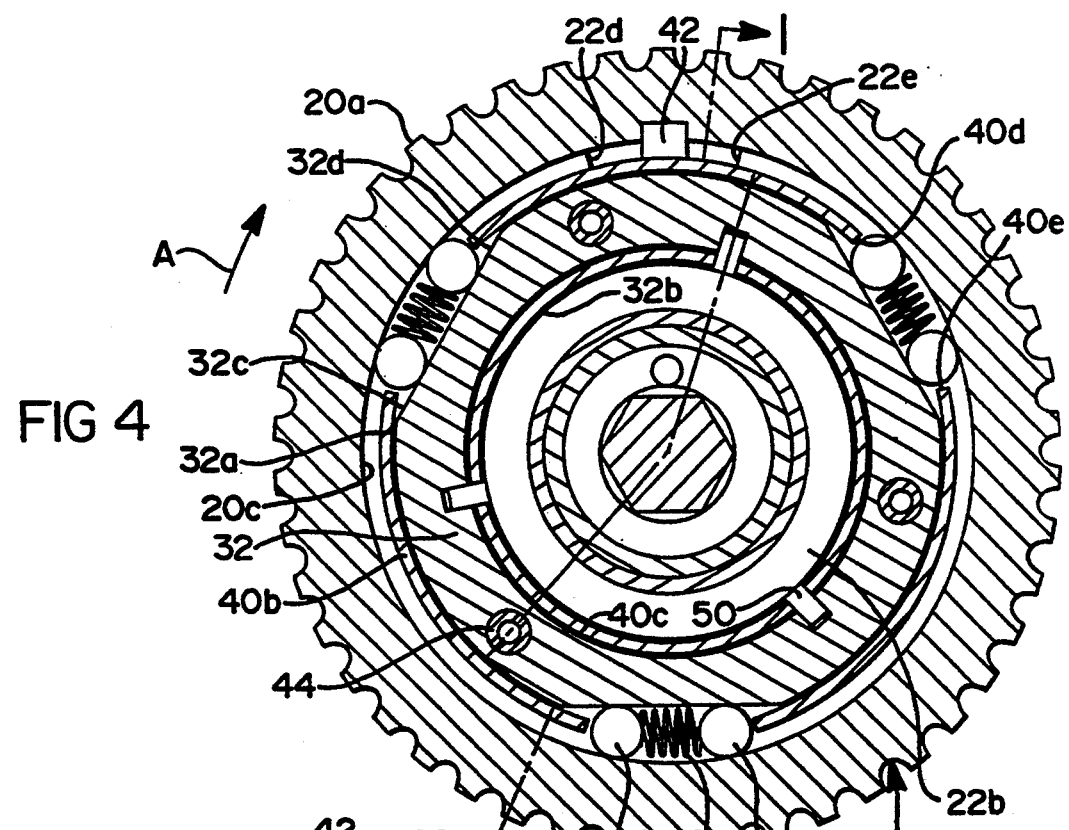
FIG. 4 is a cross-sectional view of the device looking along line 4—4 of FIG. 1.
Figure 5:
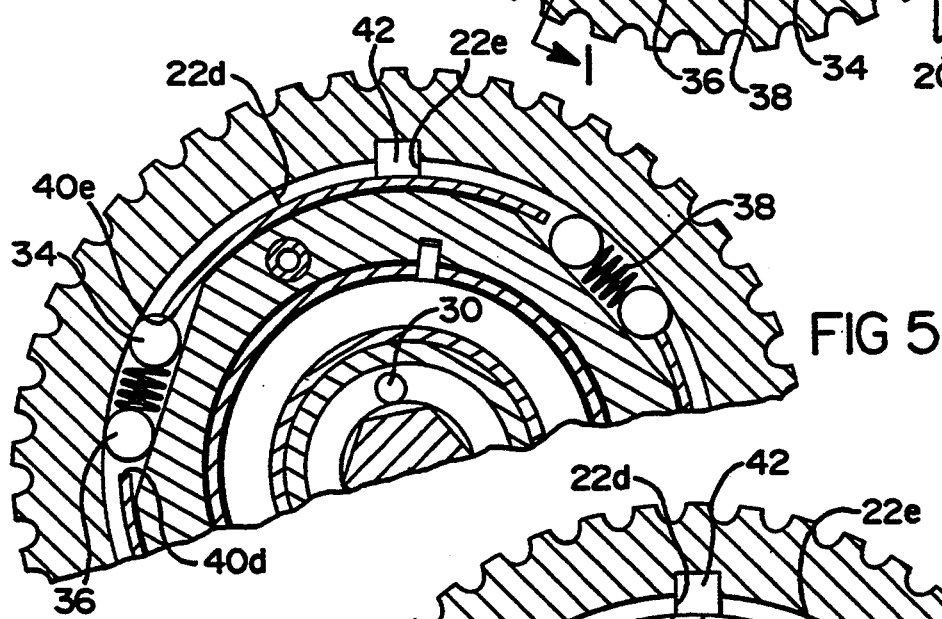
FIGS. 5 and 6 are partial views of the device in FIG. 4 and respectively illustrate phase retard and advance positions.
Figure 6:
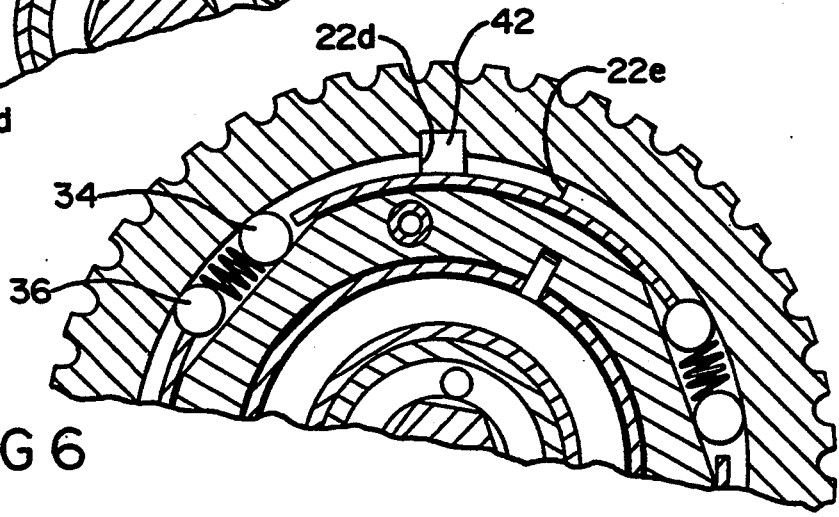

The maximum amount of relative rotation or angular phase change between drive and driven members 20,22, and therefore between the crankshaft and camshaft 12, is determined by a stop key 42 having a portion thereof snugly retained in a slot 20d of the drive member and a portion received in a circumferentially extending opening in flange portion 22b and bounded by stops 22d,22e which respectively limit full retard as illustrated in FIG. 5 and full advance as in FIG. 6. An intermediate angular phase position is illustrated in FIG. 4.

Roller clutch assembly 24 includes the race surface 20c, an annular member 32, three first and three second rollers or wedges 34,36 disposed in pairs, an accordion type compression spring 38 positioned between each pair of roller wedges, and a spider 40. Member 32 includes outer and inner cylindrical surfaces 32a, 32b, and three flat circumferentially equally spaced flat surfaces formed in the outer cylindrical surface with each flat surface defining first and second ramp surfaces 32c, 32d radially spaced from race surface 20c with the radial spacing decreasing to a minimum at the intersection of the ramps and outer cylindrical surface 32a. Herein, the flat surfaces defining ramp surfaces 32c,32d are defined as chord of a cylinder surfaces. Member 32 is rotationally secured to flange portion 22b by three pins 44 pressed at one end into holes 32e in annular member 32 and loosely received at the other end in holes 22f in flange portion 22b to allow a small amount of radial and circumferential free play relative to race surface 20c and flange 22b for purposes explained further hereinafter. Pins 44 may be of the roll pin type and may provide an amount resiliency between members 32 and 22. Each pair of first and second rollers 34,36 are disposed between the race surface and the associated ramp surfaces 32c, 32d, and are biased circumferentially apart and toward wedging engagement between the race surface and the associated ramp surface by the spring 38.

Spider 40 includes a radially extending end wall 40a and radially outer and inner cylindrical walls 40b,40c defining a generally annular trough positioned over annular member 32 and secured for limited rotation relative to the annular member by actuator assembly 24 as explained further hereinafter. Spider outer cylindrical wall 40b includes three circumferentially equally spaced openings each defining first and second circumferentially spaced apart contact surfaces 40d,40e circumferentially embracing each pair of the rollers 34,36 and respectively operative to move rollers 40d,40e counter to spring 38 and out of wedging engagement in response to rotation of the spider relative to the annular member.

Actuator assembly 24 includes an axially moveable plunger 46 having a cylindrical wall portion 46a slidably disposed over hub portion 22a of support member 22, an annular rim portion 46b extending radially outward from wall portion 46a, a helical compression spring biasing plunger 46 leftward away from support member 22 in FIG. 1, three radially extending pins 50 each press fit at one end into a hole in rim portion 46b and each slidably received at the other end in an axially extending straight slot 32f in annular member 32. Axial contact of rim portion 46b with flange portion 22b limits rightward axial or phase advance movement of the plunger and axial contact of rim portion 46b with a spacer washer 52 limits leftward axial or phase retard movement of the plunger. Plunger 46 is shown in an intermediate position in FIG. 1. Pins 50 and slots 32f prevent relative rotation between plunger 46 and annular member 32. Each pin also slidably extends through an angular or helical slot 40f in inner cylindrical wall 40c of spider 40 with the angle of each slot 40f being relative to straight slots 32f and the camshaft axis. See FIGS. 7 and 8. Hence to-and-fro axial movement of plunger 46 effects relative rotational movement between the spider and annular member 32 for disengaging either the first or the second roller wedges. A concave plug 54, axially affixed to plunder 46, is adapted to be acted on by an unshown operator mechanism selectively operative to move the plunger to any position between the leftward or phase retard position and the rightward or phase advance position. The phase advance and retard positions may be reversed by reversing the angle of slot 40f in spider wall 40c.

Herein, the circumferential spacing between contact surfaces 40d,40e is great enough to allow the pair of rollers therebetween to both be engaged at the same time to effect intermediate camshaft phase angle positions between the full retard and full advance positions. If intermediate phase angle positions are not desired, a lesser spacing of contact surfaces 40d,40e may be employed to ensure that the surfaces 40d or 40e move one of the rollers of each pair of rollers to fully disengaged positions when spider 40 is rotated relative to annular member 32 in one direction or the other. When spider 40 is configured to provide intermediate phase angle positions, it is possible to delete one or both of the stops for limiting the phase change range, whereby a given phase change device may be employed in engine applications requiring different phase change range limits. Also, the given phase change device may be provided with a maximum phase change range and the controls for different engine applications can operate the device within the desired phase change range.

Relative axial movement of drive and driven members 20,22 and annular member 32 and spider 40 is prevented by washer like end covers 56,58 retained by snap rings 60,62. Spacer washer 52 may be of variable thickness to remove unwanted axial play between end covers 56,58 due to manufacturing tolerances. When device 10 is cog belt driven and therefore in a substantially oil free environment, the device may be provided with an internal store of lubricant sealed therein by o-ring seals 64,66,68 at the interfaces of the end covers 52,54, and plunger 46 with hub portion 22a.

Operation of phase change device 10 to effect camshaft angular phase change within the limits fixed by retard and advance stops 22e,22d is rather straightforward. Rollers 36, when engaged, prevent retarding rotation of the camshaft in response to the positive torque and when disengaged, allow retarding rotation of the camshaft in response to the positive torque. Rollers 34, when engaged prevent advancing rotation of the camshaft in response to the negative torque pulses and when disengaged, allow advancing rotation of the camshaft in response to the negative torque pulses.

More specifically and first with reference to FIG. 5, the full leftward or retard position of plunger 46 positions spider 40 in its full counterclockwise or full retard position relative to annular member 32. When spider 40 is in the full retard position, rollers 36 for preventing camshaft retard in response to the positive torque are circumferentially displaced by spider contact surfaces 40e to the disengaged positions and rollers 34 for preventing camshaft advance in response to the negative torque pulses are engaged since spider contact surfaces 40d are circumferentially spaced therefrom. Hence, when the spider is in the full retard position, the camshaft will retard to the limit fixed by engagement of retard stop 22e with stop key 42.

With reference next to FIG. 6, the full rightward or advance position of plunger 46 positions spider 40 in its full clockwise or full advance position relative to annular member 32. When spider 40 is in the full advance position, rollers 34 for preventing camshaft advance in response to the negative torque pulses are circumferentially displaced by spider contact surfaces 40d to the disengaged positions and roller 36 for preventing camshaft retard in response the positive torques are engaged since spider contact surfaces 40e are circumferentially spaced therefrom. Hence, when the spider is in the full advance position, the camshaft will retard to the limit fixed by engagement of retard stop 22d with stop key 42.

With reference now to FIGS. 1 and 4, therein device 10 is shown in a phase angle position intermediate the limits set by the stops. For reasons not fully understood, when actuator plunger 46 is moved to a position intermediate its full retard and advance positions, the camshaft moves to a phase angle position intermediate the limits set by the stops with the camshaft phase angle position being substantially proportional to the intermediate position of plunger 46.

An operator mechanism for moving plunger 46 is not shown in the phase change device embodiment of FIGS. 1 and 4–6. Such a mechanism may be any of several known types, e.g., the electromagnetic type shown in FIG. 10 or the hydraulic type shown in FIG. 11. The force for moving the rollers per se is rather small. Accordingly, a force for axially moving plunger 46 is substantially proportional to the force required to compress plunger spring 48. An operator mechanism for moving the plunger may provide a variable stroke which moves the plunger selected distances independent of force or may provide variable force which moves the plunger the selected distances independent of controlled stroke. Such operator mechanisms are preferably energized by control systems which compare desired phase change with actual phase change and which adjust the operator mechanism stroke or force when desired and actual phase changes do not agree. Such control systems are well known in the prior art. An example of such a control system is disclosed in previously mentioned U.S. Pat. No. 4,627,825 which is incorporated herein by reference.

FIG. 9 illustrates a phase change device 110 which differs with respect to device 10 by incorporating therein a splitter spring 112 having ends 112a, 112b respectively affixed to a drive member 114 equivalent to drive member 20 and to a driven member 116 equivalent to driven member 22. Herein, splitter spring 112 is of the clockspring or spiral type; however, several other types may be used. Splitter spring 112 is selected to resiliently transmit the constant positive torque substantially due to valve gear friction from drive member 114 to driven member 116. Accordingly, spring 112 provides a torque path for the constant positive torque and the roller clutch assembly 118, which is the same as clutch assembly 24, provides a parallel torque path for the cyclic torque pulses.

Figure 10:
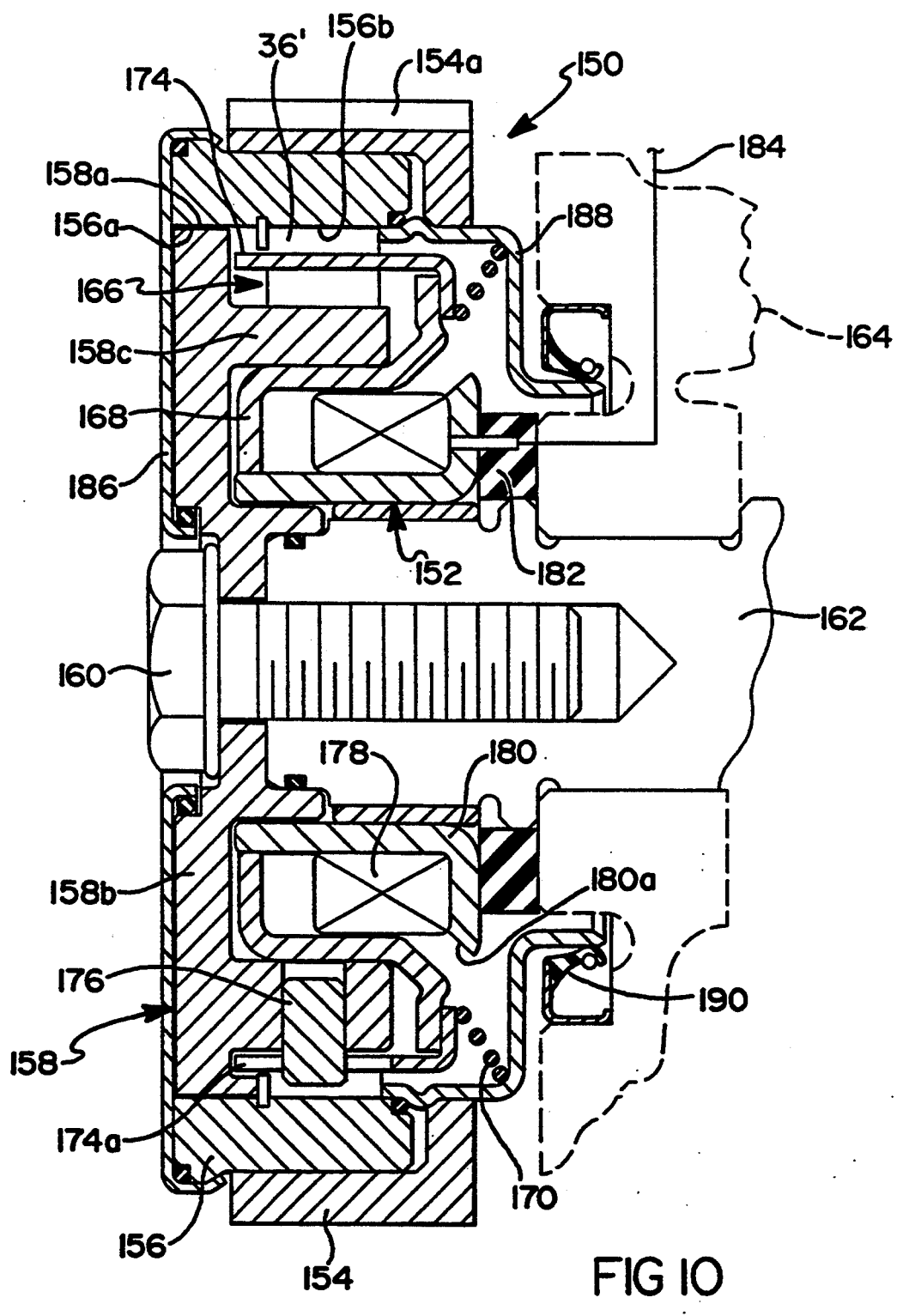
FIGS. 10–12 are sectional views of three alternative embodiments of the phase change devices.

FIG. 10 illustrates a phase change device 150 employing the same operating principles of devices 10 and 110, and differs mainly in that it contains an internal electromagnetic operator mechanism 152 in lieu of the external operator mechanism for devices 10 and 110.

Device 150 includes a drive assembly including outer and inner members 154,156 affixed together during assembly of the device, a driven or support member 158 affixed by a bolt 160 to a camshaft 162 rotationally supported by a portion of an engine housing represented by phantom lines 164, a roller clutch assembly 166, and a slidably disposed actuator plunger 168 moved rightward against leftward biasing force of a cone spring 170 in response to electrical energization of operator mechanism 152.

Member 154 includes cog teeth 154a for driving connection to a crankshaft via an unshown cog belt. Member 156 includes an inner cylindrical surface 156a journaled on an outer cylindrical surface 158a of a radially extending flange portion 158b of support member 158. Roller clutch assembly 166, having only one roller 36'shown, is substantially the same as roller clutch assembly 24 in that it includes three pair of rollers analogous to rollers 34,36, stops analogous to stops 142,22d,22e, a spider 174 having contact surfaces analogous to surfaces 40d,40e embracing each pair of rollers, an annular member portion 158c defining ramps analogous to ramps 32c,32d, and an outer race surface 156b defined by extension of surface 156a. Annular member portion 156c differs mainly from member 32 in that it is rigidly affixed to support member 158. However, either of annular members 32, 158c may be rigidly affixed or attached for free play relative to the associated support member. Further with respect to free play mounting of the annular members, such free play may alternatively be provided by free play mounting of the member defining the roller clutch outer race surface. Three radially extending pins 176 are press fit into holes in member portion 158c. The pins are spaced between the pairs of rollers and extend through angled slots 174a in spider 174 in a manner analogous to that in device 10.

Operator mechanism 152 includes a coil 178 affixed to a housing member 180 which is in turn affixed to engine housing 164 via a plastic material ring 182. A conductor 164 provides electrical connection to coil 178. Coil housing member 180 and plunger 168 are formed of ferromagnetic material which concentrates the magnetic field around coil 178 to provide magnetic attraction for pulling plunger 168 rightward toward end 180a of coil housing member 180. The magnitude of the magnetic attraction is readily varied in known manner to axially move the plunger from the full leftward or retard position to the full rightward or advance position or any intermediate position therebetween for the same reasons given for device 10. Pins 176 and angled spider slots 174a cause the spider to rotate between phase advance and retard positions in response to axial movement of the spider by plunger 168 and spring 170.

Device 150 is enclosed by end covers 186,188 and is sealed against leakage of internal lubricant by o-ring seals and a lip type seal 190.

Figure 11:
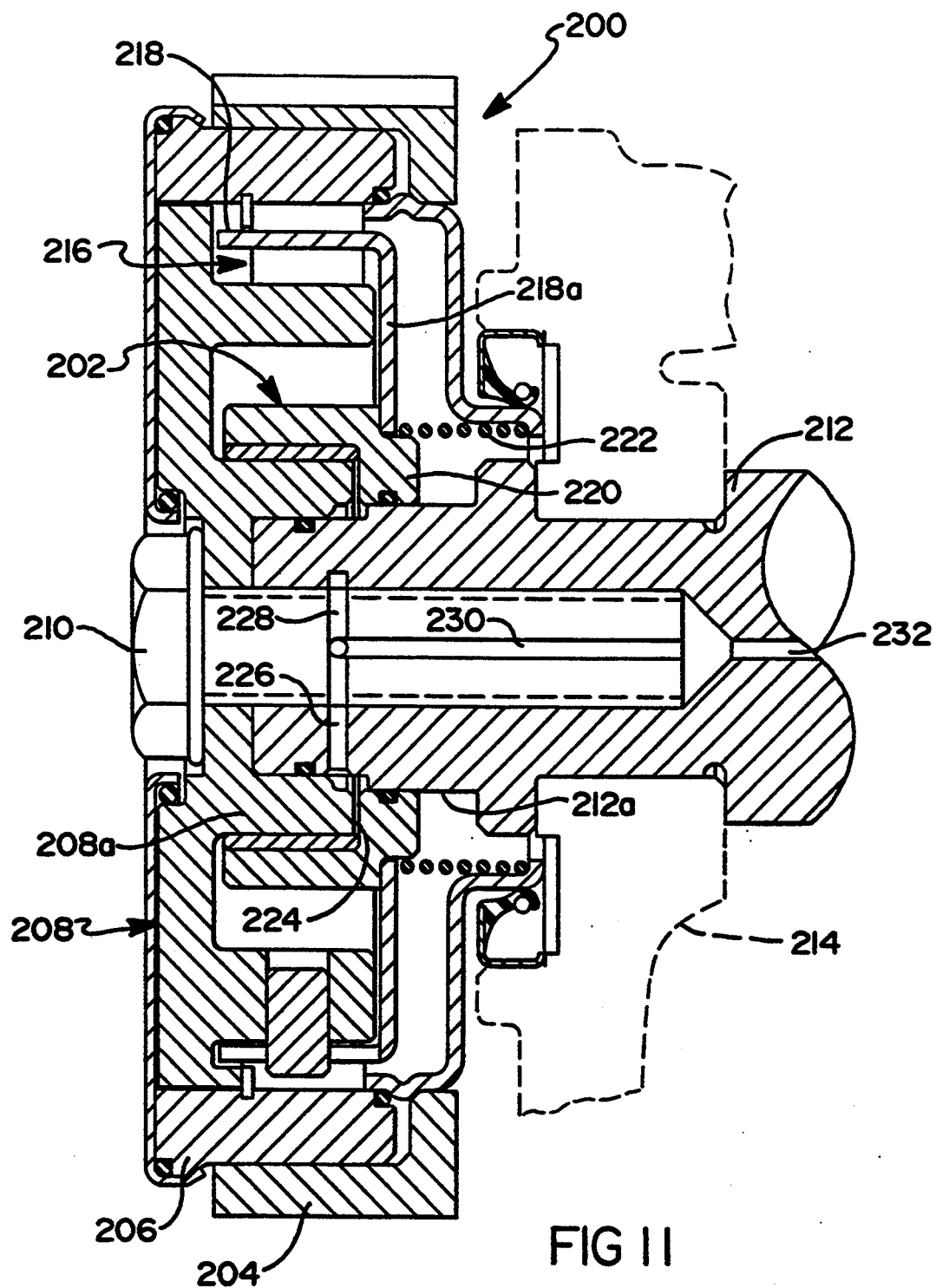

FIG. 11 illustrates another phase change device 200 which differs mainly from device 150 by employing an initial hydraulic operator mechanism 202 in lieu of the internal electromagnetic operator mechanism 152.

Device 200 includes a drive assembly including outer and inner members 204,206 affixed together during assembly of the device and of the same configuration as members 154,156, a driven or support member 208 having a hub portion 208a modified to cooperate with hydraulic operator mechanism 202 and affixed by a bolt 210 to a camshaft 212 rotationally supported by a portion of an engine housing represented by phantom lines 214, a roller clutch assembly 216 which differs from clutch assembly 166 only with respect to the radially inward length of a flange portion 218a of a spider 218, and a slidably disposed actuator piston 220 for moving the spider rightward against leftward biasing force of a compression spring 222.

Support member hub portion 208, piston 220 and the outer cylindrical surface 212a of camshaft 212 form an expandable chamber 224 connectable to a source of pressurized oil via a passage network including passages 226,228,230 and 232 in the camshaft and bolt 210. The pressure of the oil need only be sufficient to move spider 218 as in the previously described phase change devices. Accordingly, the oil may be taken from and at the pressure the oil in the engine lubrication system. The control system in previously mentioned U.S. Pat No. 4,627,825 is readily modified to control oil to and from mechanism 202. Device 200 is enclosed and sealed in the same manner as device 150, and may be lubricated by oil leakage from expandable chamber 224.

Figure 12:
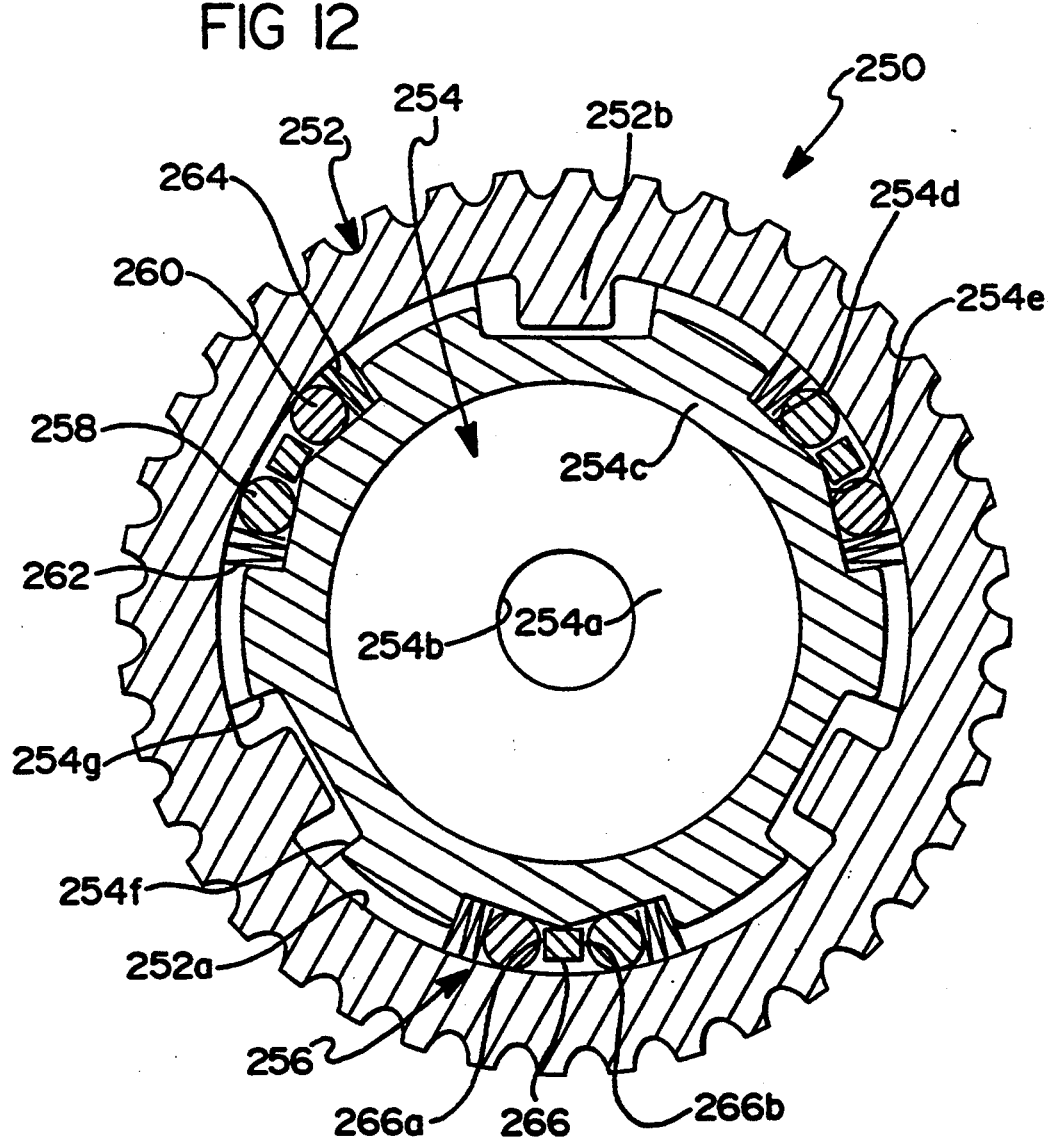

FIG. 12 illustrates yet another phase change device 250 employing the same operating principles as the previously described phase devices. Device 250 differs mainly with respect to the configuration of the roller clutch ramps and orientation of the rollers. Device 250 includes a drive member 252 drivingly connected to an engine crankshaft as previously described, a driven or support member 254 having a radially extending flange portion 254a with a central opening 254b for affixing the member to a camshaft, and a roller clutch assembly 256. The roller clutch assembly includes an outer race surface 252a defined by drive member 252, an annular member portion 254c extending axially from flange portion 254b and secured thereto, three pairs of ramp surfaces 254d, 254e, three pairs of rollers 258,260, springs 262,254 respectively biasing rollers 258,260 toward wedging engagement between race surface 252a and the associated ramp surface, a spider having axially extending fingers 266 having oppositely facing contact surfaces 266a,266b disposed between the rollers of each pair of rollers. The maximum rotational phase change is limited by stops 252b extending radially inward from drive member 252 and stop surfaces 254f,254g defined by annular member portion 254c. Operation of the roller clutch is substantially the same as in the previously described devices. Counterclockwise rotation of the spider fingers relative to annular member portion 254c disengages rollers 258 and causes support member 254 to retard relative to drive member 252, i.e., phase retard in response to the positive torque while rollers 260 remain engaged to prevent phase advance in response to negative torque pulses. Clockwise rotation of the spider fingers relative to annular member portion 254c disengages rollers 260 and causes phase advance in response to the negative torque pulses while rollers 258 remain engaged to prevent phase retard in response to the positive torque.

Several embodiments of the invention have been disclosed for illustrative purposes. Many variations and modifications of the disclosed embodiments are believed to be within the spirit of the invention. The following claims are believed to cover inventive portions of the disclosed embodiments and variations and modifications within the spirit of the invention.

What is claimed is:

1. A device including first and second members disposed for rotation about an axis and an assembly for coupling the members and selectively advancing and retarding rotation of the members relative to each other during rotation of the members in one direction by a torque having positive and negative torque pulses with respect to an average value of the torque; characterized by:

the assembly comprising an advance and a retard one-way clutch means including race surface means having a radially inwardly facing cylindrical surface concentric to the axis and common to both of the clutch means and disposed for rotation with one of the members, a plurality of first and a plurality of second ramp surfaces disposed for rotation with the other member and spaced radially inward from the race surface means, a first roller interposed for wedging engagement between each first ramp surface and the race surface means and operative when in said engagement to prevent said retarding rotation in response to the positive torque pulses, a second roller interposed for wedging engagement between each second ramp surface and the race surface means and operative when in said engagement to prevent said advancing rotation in response to the negative torque pulses, spider means moveable in first and second circumferentially opposite directions relative to the first and second ramp surfaces for respectively moving the first and second rollers out of engagement in response to movement of the spider means in axially opposite directions between first and second positions;

the spider means including a cylindrical wall disposed about an outer cylindrical surface of the second member and a radially inwardly extending portion, the spider cylindrical wall including a plurality of openings each having circumferentially spaced contact surfaces embracing each roller for effecting the movement of the first and second rollers in response to movement of the spider means in the first and second directions; and a fluid pressure actuator including an annular piston positioned concentric to the axis and disposed for contact and axial movement with the radially inwardly extending portion of the spider means, the piston for moving the spider means from the first axial position to the second axial position in response to pressurized fluid acting against an axial end surface thereof, spring means for biasing the spider means toward the first axial position and the piston to a corresponding position.

2. The device of claim 1, disposed in an engine including a camshaft, means for affixing the second member of the device to the camshaft for fixed rotation about a common axis of the device and of the camshaft, a crankshaft, and drive means interconnecting the crankshaft and the first member of the device.

3. A device including first and second members disposed for rotation about an axis and an assembly for coupling the members and selectively advancing and retarding rotation of the members relative to each other during rotation of the members in one direction by a torque having positive and negative torque pulses with respect to an average value of the torque; characterized by:

the assembly comprising an advance and a retard one-way clutch means including race surface means having a radially inwardly facing cylindrical surface concentric to the axis and common to both of the clutch means and disposed for rotation with one of the members, a plurality of first and a plurality of second ramp surfaces disposed for rotation with the other member and spaced radially inward from the race surface means, a first wedge interposed for wedging engagement between each first ramp surface and the race surface means and operative when in said engagement to prevent said retarding rotation in response to the positive torque pulses, a second wedge interposed for wedging engagement between each second ramp surface and the race surface means and operative when in said engagement to prevent said advancing rotation in response to the negative torque pulses, spider means moveable in first and second circumferentially opposite directions relative to the first and second ramp surfaces for respectively moving the first and second wedges out of engagement, the spider means including a cylindrical wall disposed about an outer cylindrical surface of the second member, the spider cylindrical wall including a plurality of openings having circumferentially spaced contact surfaces for effecting the movement of the first and second wedges in response to movement of the spider means in the first and second circumferentially opposite directions, spring means for biasing the wedges toward said wedging engagement and toward said contact surface, and actuator means for moving the spider means in said first and second circumferential opposite directions.

4. The device of claim 3, wherein:
the first and second wedges are disposed in pairs; and
the spring means includes a spring disposed between each pair of wedges with opposite ends of the spring reacting against the first and second wedges of each pair.

5. The device of claim 3, wherein:
the actuator means includes means for moving the spider axially between first and second positions, and means for moving the spider means between the first and second circumferentially opposite directions in response to the axial movement of the spider means between the first and second positions.

6. The device of claim 5, wherein:
the actuator means comprises a fluid pressure actuator including an annular, axially movable piston positioned concentric to the axis for moving the spider means from the first axial position to the second axial position in response to pressurized fluid acting against an axial end surface thereof, and spring means for biasing the spider means toward the first axial position and the piston to a corresponding position.

7. The device of claim 4, wherein:
the actuator means includes means for moving the spider axially between first and second positions, and means for moving the spider means between the first and second circumferentially opposite directions in response to the axial movement of the spider means between the first and second positions.

8. The device of claim 7, wherein:
the actuator means comprises a fluid pressure actuator including an annular, axially movable piston positioned concentric to the axis for moving the spider means from the first axial position to the second axial position in response to pressurized fluid acting against an axial end surface thereof, and spring means for biasing the spider means toward the first axial position and the piston to a corresponding position.

9. In an engine having a camshaft driven by a crankshaft, a device including first and second members disposed for rotation about an axis of the camshaft, with one of the members affixed to the camshaft and the other driven by the crankshaft, and an assembly for coupling the members and selectively advancing and retarding rotation of the members relative to each other during rotation of the members in one direction by a torque having positive and negative torque pulses with respect to an average value of the torque; characterized by:
the assembly comprising an advance and a retard one-way clutch means including race surface means having a radially inwardly facing cylindrical surface concentric to the axis and common to both of the clutch means and disposed for rotation with one of the members, a plurality of first and a plurality of second ramp surfaces disposed for rotation with the other member and spaced radially inward from the race surface means, a first wedge interposed for wedging engagement between each first ramp surface and the race surface means and operative when in said engagement to prevent said retarding rotation in response to the positive torque pulses, a second wedge interposed for wedging engagement between each second ramp surface and the race surface means and operative when in said engagement to prevent said advancing rotation in response to the negative torque pulses, spider means moveable in first and second circumferentially opposite directions relative to the first and second ramp surfaces for respectively moving the first and second wedges out of engagement, the spider means including a cylindrical wall disposed about an outer cylindrical surface of the second member, the spider cylindrical wall including a plurality of openings having circumferentially spaced contact surfaces for effecting the movement of the first and second wedges in response to movement of the spider means in the first and second circumferential opposite directions, spring means for biasing the wedges toward said wedging engagement and toward said contact surface, and actuator means for moving the spider means in said first and second circumferential opposite directions.

10. The device of claim 9, wherein:
the first and second wedges are disposed in pairs; and
the spring means includes a spring disposed between each pair of wedges with opposite ends of the spring reacting against the first and second wedges of each pair.

11. The device of claim 9, wherein:
the actuator means includes means for moving the spider axially between first and second positions, and means for moving the spider means between the first and second circumferentially opposite directions in response to the axial movement of the spider means between the first and second positions.

12. The device of claim 11, wherein:
the actuator means comprises a fluid pressure actuator including an annular, axially movable piston positioned concentric to the axis for moving the spider means from the first axial position to the second axial position in response to pressurized fluid acting against an axial end surface thereof, and spring means for biasing the spider means toward the first axial position and the piston to a corresponding position.

13. The device of claim 10, wherein:
the actuator means includes means for moving the spider axially between first and second positions, and means for moving the spider means between the first and second circumferentially opposite directions in response to the axial movement of the spider means between the first and second positions.

14. The device of claim 13, wherein:
the actuator means comprises a fluid pressure actuator including an annular, axially movable piston positioned concentric to the axis for moving the spider means from the first axial position to the second axial position in response to pressurized fluid acting against an axial end surface thereof, and spring means for biasing the spider means toward the first axial position and the piston to a corresponding position.

* * * * *